United States Patent
Herle et al.

(10) Patent No.: US 7,810,088 B2
(45) Date of Patent: Oct. 5, 2010

(54) APPARATUS AND METHOD FOR PERFORMING A FAIL-SAFE OVER-THE-AIR SOFTWARE UPDATE IN A MOBILE STATION

(75) Inventors: Sudhindra P. Herle, Plano, TX (US); Guoxin Fan, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1071 days.

(21) Appl. No.: 10/600,056

(22) Filed: Jun. 20, 2003

(65) Prior Publication Data
US 2004/0261073 A1 Dec. 23, 2004

(51) Int. Cl.
*G06F 9/44* (2006.01)
*G06F 11/00* (2006.01)

(52) U.S. Cl. .......................... 717/173; 717/178; 714/6; 714/15

(58) Field of Classification Search ........................ None
See application file for complete search history.

(56) References Cited

U.S. PATENT DOCUMENTS

| 4,517,663 | A | 5/1985 | Imazeki et al. |
| 5,701,492 | A | 12/1997 | Wadsworth et al. |
| 6,687,901 | B1* | 2/2004 | Imamatsu ................... 717/173 |
| 6,754,894 | B1* | 6/2004 | Costello et al. .............. 717/169 |
| 6,928,579 | B2* | 8/2005 | Aija et al. ....................... 714/6 |
| 2001/0051519 | A1 | 12/2001 | Shirai | |

FOREIGN PATENT DOCUMENTS

| EP | 1 052 571 A2 | 11/2000 |
| EP | 1 241 571 A2 | 9/2002 |
| KR | 1020010007066 A | 1/2001 |

* cited by examiner

*Primary Examiner*—Michael J Yigdall

(57) ABSTRACT

A wireless communication device capable of downloading a software update file from a wireless network. The wireless communication device comprises a non-volatile memory that is re-programmed by sectors. The non-volatile memory stores: i) a target file to be updated, ii) the downloaded software update file, and iii) a journal comprising a plurality of entries, each of the entries containing status information associated with a re-programmed sector of the non-volatile memory. The wireless communication device also comprises a random access memory and a main processor that replaces target code in the target file with replacement code from the downloaded software update file. The main processor creates a first block of replacement code in the random access memory and re-programs a first target sector of the non-volatile memory by storing the first block of replacement code into the first target sector. The main processor updates first status information in a first entry in the journal associated with the first target sector.

18 Claims, 5 Drawing Sheets

APPARATUS AND METHOD FOR PERFORMING A FAIL-SAFE OVER-THE-AIR SOFTWARE UPDATE IN A MOBILE STATION

TECHNICAL FIELD OF THE INVENTION

The present invention is directed generally to wireless communication systems and, more specifically, to an apparatus and method for performing fail-safe patching of software in a wireless communication device.

BACKGROUND OF THE INVENTION

In order to increase the wireless market to the greatest extent possible, wireless service providers and wireless equipment manufacturers constantly seek new ways to make wireless equipment and services as convenient, user-friendly, and affordable as possible. To that end, wireless service providers and the manufacturers of wireless mobile stations, such as cell phones, and fixed (or stationary) wireless terminals, frequently work together to streamline procedures for enrolling and equipping new subscribers and for improving the services and equipment of existing subscribers.

One important aspect of these efforts involves over-the-air (OTA) provisioning and upgrading of wireless mobile stations, such as cell phones, wireless personal digital assistants (PDAs), wireless hand-held computers, two-way pagers, and the like, as well as fixed wireless terminals. OTA provisioning is a relatively new feature that enables a new subscriber who purchases a new cell phone (or other wireless device) to set up a new account with a wireless service provider and to configure the new cell phone for operation. Over-the-air (OTA) upgrading of a wireless device also is a relatively new procedure that enables a subscriber to download and install updated software containing patches, bug fixes, and newer versions of the software, including the operating system, stored in the wireless device. The wireless service provider or the mobile station manufacturer, or both, may provide the updated software.

However, one drawback to an OTA update procedure is that user interference may render the mobile station useless. Typically, the user interference causes power to be shut off during the application of a software update file. The power shut-off may be intentional (i.e., user removes battery) or accidental (i.e., user drops mobile and battery dislodges). In any event, the new code from the downloaded update file may be only partially applied to the non-volatile memory when power is cut off. As a result, when the mobile station is powered up again, the corrupted code in the non-volatile memory may render the mobile station useless.

Therefore, there is a need in the art for improved systems and methods for performing automatic software updates of wireless mobiles stations and fixed wireless terminals. In particular, there is a need for a method of replacing the software of a wireless communication device that does not render the wireless communication device useless if power is suddenly lost during application of the updated software.

SUMMARY OF THE INVENTION

The present invention comprises an apparatus and method for fail-safe application of downloaded software update file (i.e., patch code) for a wireless communication device. One object of the present invention is to apply the downloaded software file in such a manner that no accidental or deliberate action on the part of the user during the application of the software update file will render the wireless communication device useless. The present invention accomplishes this using an algorithm comprising two parts: i) construction of a journal, and ii) recovery using information stored in the journal in case of abnormal power loss (interruption to the patch application process).

To address the above-discussed deficiencies of the prior art, it is a primary object of the present invention to provide a wireless communication device capable of downloading a software update file from a wireless network. According to an advantageous embodiment of the present invention, the wireless communication device comprises: 1) a non-volatile memory capable of being re-programmed by sectors, wherein the non-volatile memory stores: i) a target file to be updated, ii) the downloaded software update file, and iii) a journal comprising a plurality of entries, each of the plurality of entries containing status information associated with a re-programmed sector of the non-volatile memory; 2) a random access memory; and 3) a main processor capable of replacing target code in the target file with replacement code from the downloaded software update file. The main processor creates a first block of replacement code in the random access memory and re-programs a first target sector of the non-volatile memory by storing the first block of replacement code into the first target sector. The main processor updates first status information in a first entry in the journal associated with the first target sector.

It is another primary object of the present invention to provide a wireless communication device capable of receiving and storing an incoming software update file transmitted by a wireless network. According to an advantageous embodiment of the present invention, the wireless communication device comprises: 1) a non-volatile memory capable of being re-programmed by sectors, wherein the non-volatile memory stores: i) a downloaded software update file, and ii) a journal comprising a plurality of entries, each of the plurality of entries containing status information associated with a re-programmed sector of the non-volatile memory, 2) a random access memory, and 3) a main processor capable of storing replacement code from the incoming software update file in the downloaded software update file. The main processor stores a first block of replacement code from the incoming software update file in the random access memory and re-programs a first target sector of the downloaded software update file in the non-volatile memory by storing the first block of replacement code into the first target sector. The main processor updates first status information in a first entry in the journal associated with the first target sector.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless communication device.

Figure 1:
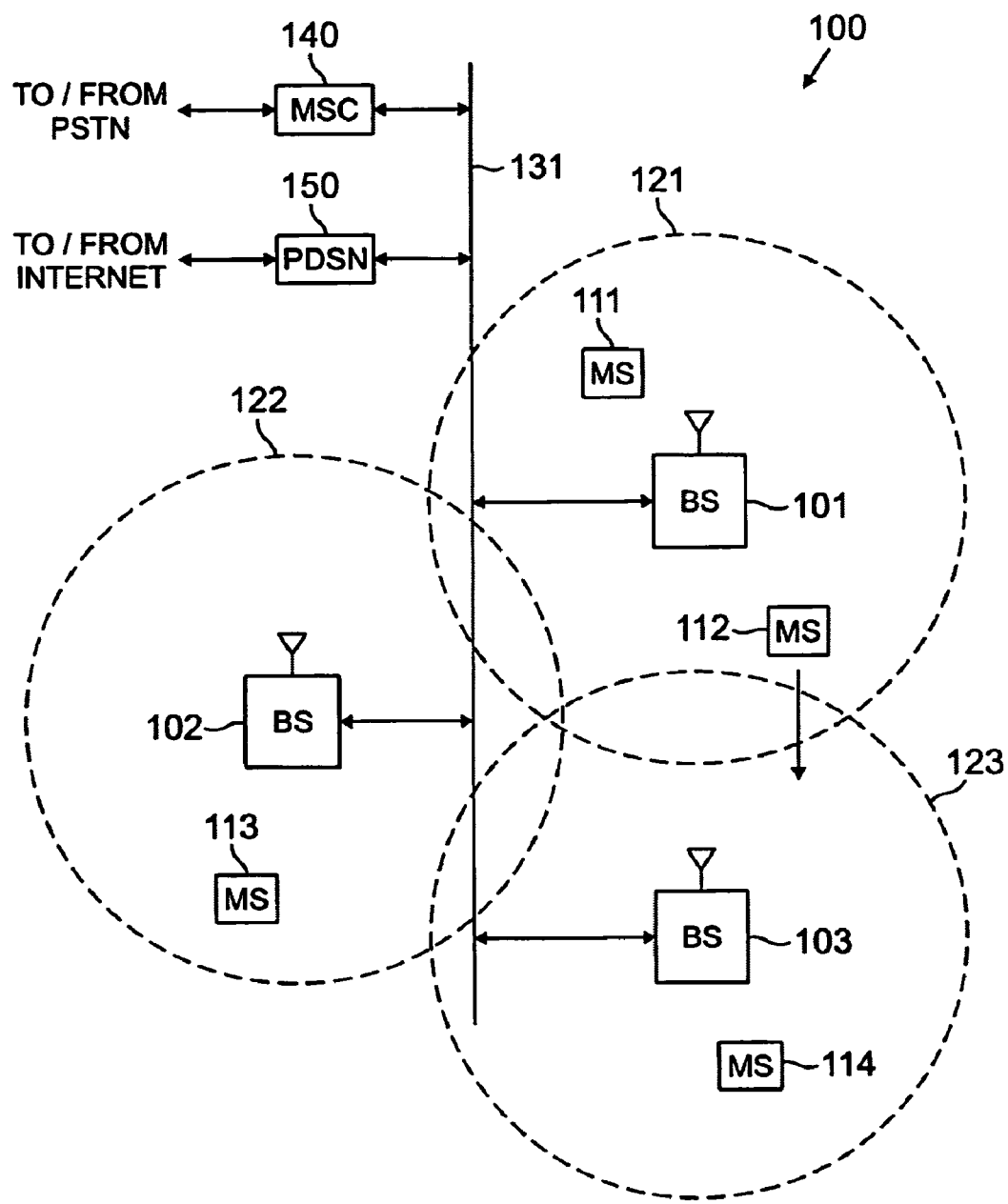
FIG. 1 illustrates an exemplary wireless network according to one embodiment of the present invention.

FIG. 1 illustrates exemplary wireless network 100 according to one embodiment of the present invention. Wireless network 100 comprises a plurality of cell sites 121-123, each containing one of the base stations, BS 101, BS 102, or BS 103. According to the illustrated exemplary embodiment of the present invention described herein, base stations 101-103 communicate with a plurality of mobile stations (MS) 111-114 over code division multiple access (CDMA) channels. However, in alternate embodiments of the present invention, base stations 101 10₃ may communicate with mobile stations 111-114 over other types of multiple access channels, including TDMA channels, FDMA channels, GSM channels, and the like. Mobile stations 111-114 may be any suitable wireless devices, including conventional cellular radiotelephones, PCS handset devices, personal digital assistants, portable computers, or metering devices.

However, it should be understood that the present invention is not limited to mobile devices. Other types of access terminals may be used, including fixed (i.e., stationary) wireless terminals. For the sake of simplicity, only mobile stations are shown and discussed hereafter. However, for the purposes of defining the scope of the claims of the present invention, the terms "mobile station," "wireless communication device," "wireless terminal," and any other term used to denote a device that wirelessly communicates with a base station should be construed broadly to include both mobile and stationary wireless access devices.

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each one of cell sites 121-123 comprises a plurality of sectors (not shown), each sector being illuminated by a directional antenna coupled to the base station. The embodiment of FIG. 1 illustrates the base station in the center of the cell. Alternate embodiments position the directional antennas in corners of the sectors. The present invention is not limited to any particular cell site configuration.

In one embodiment of the present invention, each one of BS 101, BS 102, and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem (BTS) comprises the RF transceivers, antennas, and other electrical equipment located in each cell site. This equipment may include air conditioning units, heating units, electrical power supplies, telephone line interfaces, and RF transmitters and RF receivers. For the purpose of simplicity and clarity in explaining the operation of the present invention, the base transceiver subsystem(s) in each of cells 121, 122, and 123 and the base station controller (BSC) associated with each base transceiver subsystem (BTS) are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center MSC) 140. BS 101, BS 102 and BS 103 also transfer data signals, such as packet data, with the Internet (not shown) via communication line 131 and packet data server node (PDSN) 150. Line 131 also provides the connection path to transfers control signals between MSC 140 and BS 101, BS 102 and BS 103 used to establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. Those skilled in the art will recognize that the connections on line 131 may provide a transmission path for transmission of analog voice band signals, a digital path for transmission of voice signals in the pulse code modulated (PCM) format, a digital path for transmission of voice signals in an Internet Protocol (IP) format, a digital path for transmission of voice signals in an asynchronous transfer mode (ATM) format, or other suitable connection transmission protocol. Those skilled in the art will recognize that the connections on line 131 may provide a transmission path for transmission of analog or digital control signals in a suitable signaling protocol.

MSC 140 is a switching device that provides services and coordination between the subscribers in a wireless network and external networks, such,as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

As is well known, the hand-off procedure transfers control of a call from a first cell site to a second cell site. As MS 112 moves from cell 121 to cell 123, MS 112 detects the pilot signal from BS 103 and sends a Pilot Strength Measurement Message to BS 101. When the strength of the pilot transmitted by BS 103 and received and reported by MS 112 exceeds a threshold, BS 101 initiates a soft hand-off process by signaling the target BS 103 that a handoff is required as described in TIA/EIA IS-95 or TIA/EIA IS-2000.

BS 103 and MS 112 proceed to negotiate establishment of a communications link in the CDMA channel. Following establishment of the communications link between BS 103 and MS 112, MS 112 communicates with both BS 101 and BS 103 in a soft handoff mode. Those acquainted with the art will recognize that soft hand-off improves the performance on both forward (BS to MS) channel and reverse (MS to BS) channel links. When the signal from BS 101 falls below a predetermined signal strength threshold, MS 112 may then drop the link with BS 101 and only receive signals from BS 103. The call is thereby seamlessly transferred from BS 101 to BS 103. The above-described soft hand-off assumes the mobile station is in a voice or data call. An idle hand-off is the hand-off between cells sites of a mobile station that is communicating in the control or paging channel.

Any or all of the mobile stations. (including fixed wireless terminals) in wireless network 100 may be updated by means of an over-the-air (OTA) update procedure that transfers new software to the mobile stations from a remote update server. The remote update server (not shown) may be accessed via PDSN 150 or MSC 140. In one embodiment of the present invention, the update server may update an existing software file (or target file) in a mobile station by transmitting a new image file that replaces the target file in its entirety.

In an alternate embodiment, the remote server may transmit a delta file that performs a byte-by-byte replacement of only selected portions of the target software file, rather than the entire target file. The mobile station executes a software algorithm that reads instructions and data from the delta file. The software algorithm modifies, for example, the existing operating system software to produce a new (or updated) version of the operating system software. In this advantageous embodiment, the mobile station downloads a small delta file over the air, rather than a large image file, thereby saving bandwidth. Unique apparatuses and methods for upgrading the software of a mobile station using delta files are disclosed in greater detail in U.S. patent application Ser. No. 10/358,570, filed on Feb. 5, 2003, entitled "System and Method for Delta-Based Over-the-Air Software Updates for a Wireless Mobile Station" and in U.S. patent application Ser. No. 10/366,758, filed on Feb. 14, 2003, entitled "Apparatus and Method for Upgrading Software of a Wireless Mobile Station." patent application Ser. Nos. 10/358,570 and 10/366, 758 are commonly assigned to the assignee of the present invention. The disclosures of patent application Ser. Nos. 10/358,570 and 10/366,758 are hereby incorporated by reference into the present application as if fully set forth herein.

Figure 2:
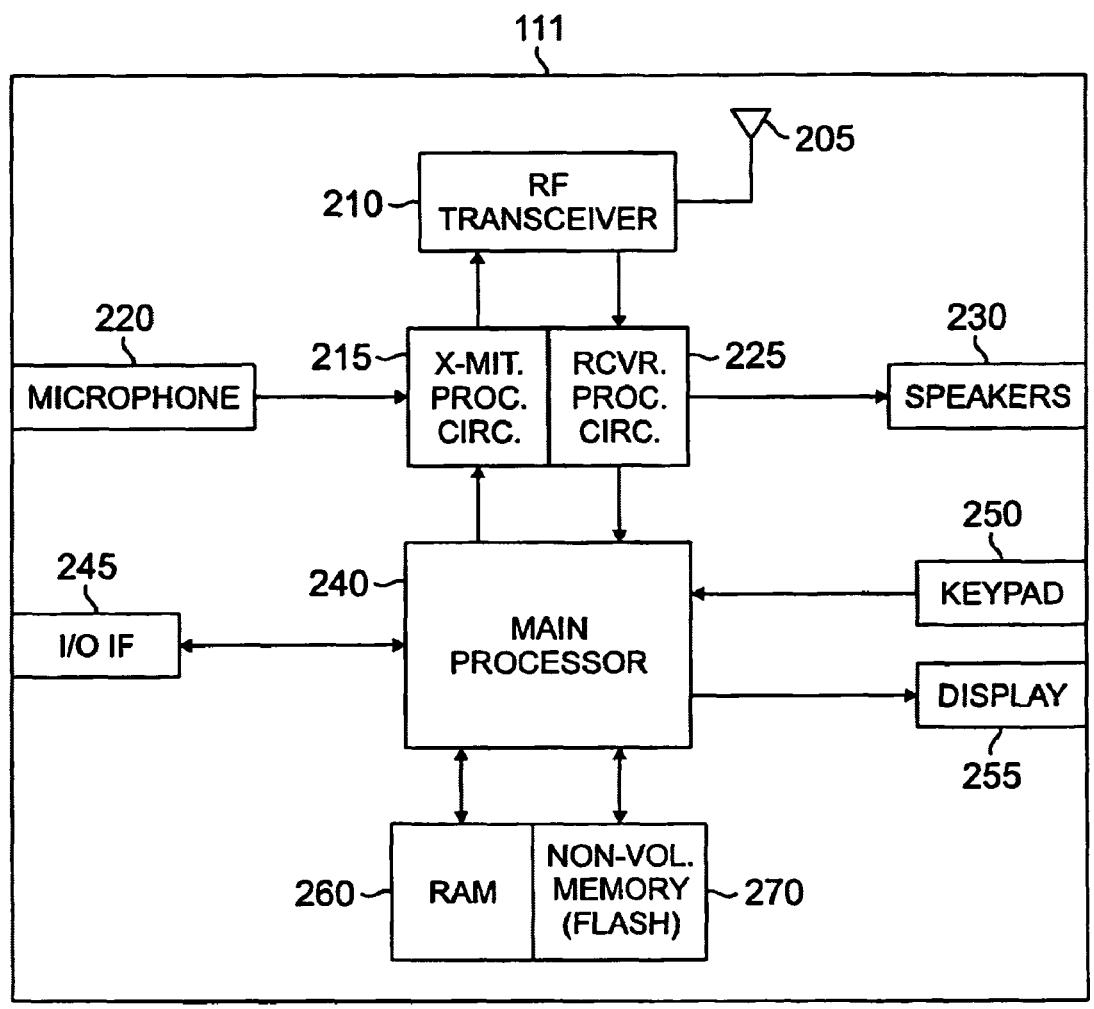
FIG. 2 illustrates an exemplary mobile station in greater detail according to one embodiment of the present invention.

FIG. 2 illustrates exemplary mobile station 111 according to an advantageous embodiment of the present invention. Wireless mobile station 111 comprises antenna 205, radio frequency (RF) transceiver 210, transmit (TX) processing circuitry 215, microphone 220, and receive (RX) processing circuitry 225. MS 111 also comprises speaker 230, main processor 240, input/output (I/O) interface (IF) 245, keypad 250, and display 255. The memory elements of mobile stations (MS) 111 comprise random access memory (RAM) 260 and non-volatile (NV) memory 270.

Radio frequency (RF) transceiver 210 receives from antenna 205 an incoming RF signal transmitted by a base station of wireless network 100. Radio frequency (RF) transceiver 210 down-converts the incoming RF signal to produce an intermediate frequency (IF) or a baseband signal. The IF or baseband signal is sent to receiver (RX) processing circuitry 225, which filters, decodes and/or digitizes the baseband or IF signal to produce a processed baseband signal. Receiver (RX) processing circuitry 225 transmits the processed baseband signal to speaker 230 (e.g., voice data) or to main processor 240 for further processing (e.g., web browsing).

Transmitter (TX) processing circuitry 215 receives analog or digital voice data from microphone 220 or other outgoing baseband data (e.g., web data, e-mail, interactive video game data) from main processor 240. Transmitter (TX) processing circuitry 215 encodes, multiplexes, and/or digitizes the outgoing baseband data to produce a processed baseband or IF signal. Radio frequency (RF) transceiver 210 receives the outgoing processed baseband or IF signal from transmitter (TX) processing circuitry 215. Radio frequency (RF) transceiver 210 up-converts the baseband or IF signal to a radio frequency (RF) signal that is transmitted via antenna 205.

In an advantageous embodiment of the present invention, main processor 240 is a microprocessor or microcontroller. RAM 260 and non-volatile (NV) memory 270 are coupled to main processor 240. NV memory 270 comprises a flash memory, which acts as a read-only memory (ROM). Main processor 240 executes an operating system (OS) program that controls the overall operation of wireless mobile station 111. The OS program is loaded from NV memory 270 into RAM 260 for execution. In typical operations, main processor 240 controls the reception of forward channel signals and the transmission of reverse channel signals by radio frequency (RF) transceiver 210, receiver (RX) processing circuitry 225, and transmitter (TX) processing circuitry 215, in accordance with well-known principles.

Main processor 240 is capable of executing other processes and programs resident in RAM 260 and NV (flash) memory 270. Main processor 240 can move data into or out of RAM 260, as required by an executing process. Main processor 240 is also coupled to I/O interface 245. I/O interface 245 provides mobile station 111 with the ability to connect to other devices such as laptop computers and handheld computers. I/O interface 245 is the communication path between these accessories and main controller 240.

Main processor 240 is also coupled to keypad 250 and display unit 255. The operator of mobile station 111 uses keypad 250 to enter data into mobile station 111. Display 255 may be a liquid crystal display capable of rendering text and/or at least limited graphics from web sites. Alternate embodiments may use other types of displays.

Main processor 240 is capable of receiving and installing software updates. This over-the-air (OTA) update may be initiated by any conventional triggering event, such as an operator-initiated action, an automated periodic procedure (i.e., expiration or a timer in MS 111), or receipt of a notification message from the remote update server. Unique apparatuses and methods for upgrading mobile station software using a notification message from the remoter server are disclosed in greater detail in U.S. patent application Ser. No. 10/366,758, filed on Feb. 14, 2003, entitled "Apparatus and Method for Upgrading Software of a Wireless Mobile Station." patent application Ser. No. 10/355,758 is commonly assigned to the assignee of the present invention. The disclosure of patent application Ser. No. 10/366,758 is hereby incorporated by reference into the present application as if fully set forth herein.

In response to any of these triggering events, main processor 240 establishes a communication link to wireless network 100 and to the remote update server via the Internet connection of wireless network 100. After the software update file has been downloaded from the remote update server, main processor 240 performs the update by replacing the target file in its entirety with the new image file or, if the update file is a delta file, by executing the delta file and replacing selected portions of the target file. As noted above, it is entirely possible that a power failure may occur during the file replacement (or patching) process that results in an incomplete update operation that renders MS 111 useless. To prevent this from happening, the present invention implements a novel method of tracking the application of the updated software file that prevents a power interruption from rendering MS 111 useless.

The foregoing is accomplished using a journal that tracks the application of the updated software on a sector-by-sector basis in NV memory 270. The construction of the journal is based on the idea of isolating the patch application process into sector-sized blocks of NV memory 270. Each such block of the updated software maps to a hardware flash sector (or block) size of NV memory 270. It is noted flash memory devices, such as NV memory 270 may be erased only in sector-sized quantities. Each sector size is typically 64 Kbytes in size. Furthermore, it is noted that the only time it is necessary to observe care is during operations that physically modify the flash sectors, such as sector-erase operations or sector-write operations.

Figure 3:
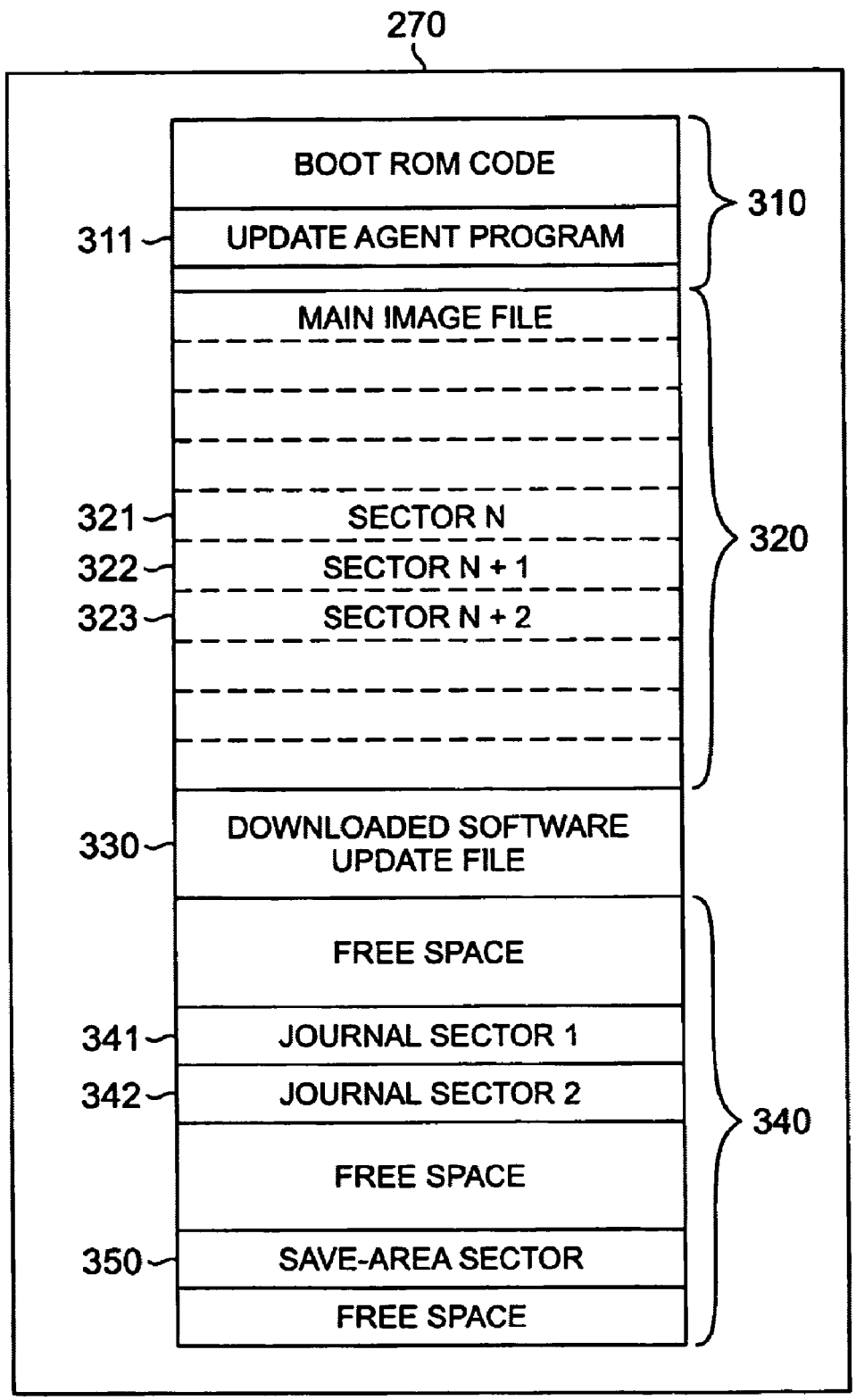
FIG. 3 illustrates selected portions of non-volatile memory in the exemplary mobile station according to one embodiment of the present invention.

FIG. 3 illustrates selected portions of non-volatile (NV) memory 270 in exemplary mobile station 111 according to one embodiment of the present invention. NV memory 310 comprises boot ROM code file 310, main image file 320, downloaded software update file 330, and free space 340. Boot ROM code file 310 is a read-only section of NV memory. 310 that contains the basic operating system code, including update agent program 311. Data is never written to boot ROM code file 310. Main image file 320 contains the end-user software applications that are executed by main processor 240 in MS 111. Main image file 320 contains the target software code that is patched and/or replaced whenever updated software is downloaded over-the-air from wireless network 100. The code in main image file 320 is replaced (i.e., re-programmed) in sector-sized blocks. The dotted lines in main image file 320 indicate sector boundaries. Exemplary consecutive sectors 321, 322 and 322 are arbitrarily labeled Sector N, Sector N+1, and Sector N+2, respectively.

When MS 111 downloads a code patch or other updated software from the remote update server, main processor 240 stores the new code in downloaded software update file 330. Main processor 240 then executes update agent program 311, which applies the patch code to main image file 320. If a sudden power loss occurs and MS 111 is re-booted, main processor 240 automatically executes update agent program 311 as part of the normal boot-up procedure in boot ROM code 310. As will be explained below in greater detail, this allows an incomplete software update procedure to be automatically resumed when MS 111 is re-booted.

Assuming a delta file in downloaded software update file 330 is used to update main image file 320, each patch instruction modifies several contiguous bytes of memory within a sector (or its adjacent neighbor). These modifications are not immediately committed to NV memory 270, but are instead cached in a sector-sized block in RAM 260. Once the patch algorithm crosses a sector boundary, the entire cached sector from RAM 260 programmed into NV memory 270. Thus, NV memory 270 is re-programmed in sector-sized blocks. If an entire new image file is downloaded instead of a delta file, the new code is still assembled in a sector-sized block in RAM 260 before being programmed into NV memory 270.

After each sector of NV memory 270 is modified, a "journal" (or log record) is written that describes the operation that was successfully performed. Each journal entry is written into one of two sectors of free space 340 in NV memory 270. Sector 341 of NV memory 270 is arbitrarily labeled "Journal Sector 1" and sector 342 of NV memory 270 is arbitrarily labeled "Journal Sector 2." The journal entries are written in Journal Sector 1 and Journal Sector 2 in contiguous fashion, without erasing previous journal entries.

In order to retain enough information for recovery after a sudden power loss, two independently erasable sectors of flash memory 270 (sectors 341 and 342) are required for writing the journal. When one journal sector is filled with journal records, the second journal sector is erased and used for the next journal entry. Thus, any power loss during the erasing of the second journal sector will not affect the information already committed to the first journal sector. This order of switching between Journal Sector 1 and Journal Sector 2 is crucial to the recovery algorithm. It guarantees that at any point in time, a valid journal record is present that accurately describes the last successful sector re-programming operation in NV memory 270.

Additionally, the present invention uses save-area sector 350 of NV memory 270 to save the previous contents of a sector that is about to be modified with results from applying patch instructions. Save-area sector 350 is necessary to restore the previous contents if the sector-modify operation is interrupted.

Figure 4:
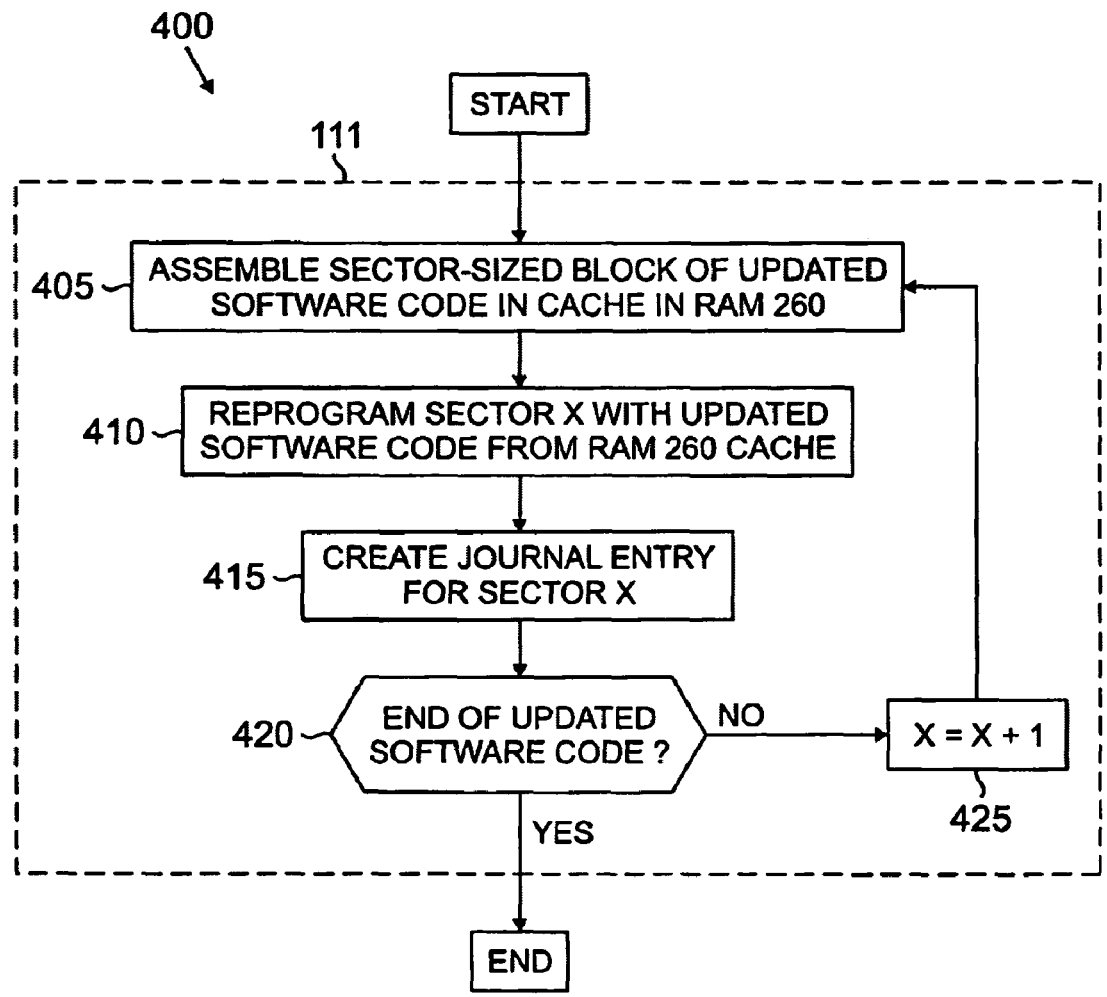
FIG. 4 is a flow diagram illustrating a software patch application operation of the exemplary mobile station according to the principles of the present invention.

FIG. 4 depicts flow diagram 400, which illustrates a software patch application operation of exemplary mobile station 111 according to the principles of the present invention. Initially, main processor 240, under the control of update program 311, assembles a sector-sized block of updated software code in the cache in RAM 260 (process step 405). Next, main processor 240 reprograms a target sector (Sector X) with the sector-sized block of updated software code from the cache in RAM 260 (process step 410). When Sector X is re-programmed, main processor 240 creates a journal entry in Journal Sector 1 or Journal Sector 2 that corresponds to updated Sector X (process step 415).

Next, main processor 240 determines whether there is more updated software code in downloaded software update file 330 (process step 420). If no more updated software code remains, the software update procedure ends. However, if downloaded software update file 330 still contains new updated software code that must be programmed into main image file 320 in NV memory 270, then main processor 240 moves to the next sequential sector after Sector X (process step 425) and repeats steps 405, 410 and 415 for Sector X+1. This process repeats until all new updated software code in downloaded software update file 330 has been programmed into NV memory 270.

Each journal entry in Journal Sector 1 and Journal Sector 2 contains three (3) parameters: 1) FLUSH_SECTOR, 2) SAVE_OK, and 3) COMMIT_OK. The FLUSH_SECTOR parameter indicates the start of a sector modification process. The SAVE_OK parameter indicates that the previous contents of the sector were saved correctly in save-area sector

350. The COMMIT_OK parameter indicates that the modified sector was updated successfully.

During the software update process, commit operations are interleaved with journal entries according to the following algorithm:

Algorithm—Update Sector from RAM 270 Cache

Inputs: RAM-Buffer, Sector-Address, Last-Instruction-Applied.
   Step 1—Write journal entry: FLUSH_SECTOR with instr=Last-Instruction-Applied, Sector-Address.
   Step 2—Save the old contents at Sector-Address to save-area sector 350.
   Step 3—Write journal entry: SAVE_OK.
   Step 4—Erase the sector at Sector-Address.
   Step 5—Write data from RAM-Buffer to Sector-Address.
   Step 6—Write journal entry: COMMIT_OK.

As each sector is modified in the sequence described above, it contains enough information to recover if there is any kind of abnormal power loss at any point in Step 1 through Step 6.

The recovery algorithm is based on the following observations. First, if there is power loss before or during Step 1, then Journal Sector 1 (or Journal Sector 2) has a complete set of information from the prior sector update. More importantly, the target sector that was about to be modified still has the unmodified data. Thus, it is possible to recover and continue. Second, if there is a power loss before Step 3, but after Step 1, then it is the same as the previous case (i.e., the target sector is not modified). Third, if there is a power loss after Step 3, but before Step 6, then Journal Sector 1 (or Journal Sector 2) indicates that the old contents of the sector were saved successfully (i.e., the presence of the SAVE_OK journal parameter). Thus, upon re-boot, main processor 240 restores the contents of the sector from save-area sector 350 before continuing. Fourth, if there is a power loss after Step 6, the sector was modified successfully and there is a journal record to prove it. In such a case, the recovery operation simply continues after the update instruction that was last processed.

The present invention is not limited to the re-programming of the sectors of main image file 320. A journal according to the principles of the present invention may also be used to download and store the updated software into downloaded software update file 330. If a sudden power loss occurs during the download process, the journal may be used to resume the download operation at the next sequential sector following the last successfully downloaded and saved sector of downloaded software update file 330.

Figure 5:
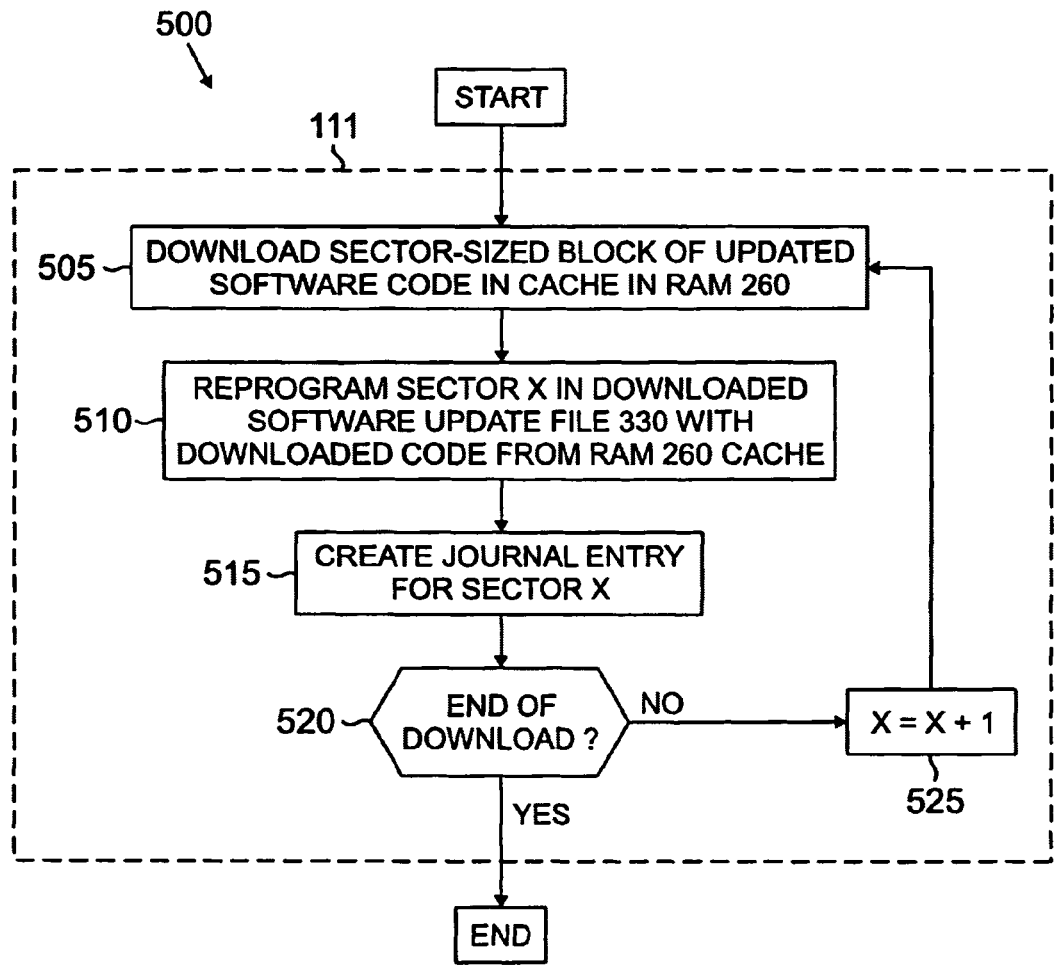
FIG. 5 is a flow diagram illustrating a software download operation of the exemplary mobile station according to the principles of the present invention.

FIG. 5 depicts flow diagram 500, which illustrates a downloading operation of exemplary mobile station 111 according to the principles of the present invention. Initially, main processor 240, under the control of update program 311, downloads from the remote update server a sector-sized block of updated software code in the cache in RAM 260 (process step 505). Next, main processor 240 reprograms a target sector (Sector X) of downloaded software updated file 330 with the sector-sized block of downloaded code from the cache in RAM 260 (process step 510). When Sector X is re-programmed, main processor 240 creates a journal entry in Journal Sector 1 or Journal Sector 2 that corresponds to Sector X of downloaded software updated file 330 (process step 515).

Next, main processor 240 determines whether there is more updated software code to be downloaded from the remote update server (process step 520). If there is no more updated software code to be sent by the remote server, the download operation ends. However, if the remote server is still transmitting new updated software to be stored in downloaded software update file 330 in NV memory 270, then main processor 240 moves to the next sequential sector after Sector X (process step 525) and repeats steps 505, 510 and 515 for Sector X+1. This process repeats until all new updated software code has been received from the remote update server and stored in downloaded software update file 330 in NV memory 270.

If a power loss occurs at any point during the download operation, then the entries in Journal Sector 1 and Journal Sector 2 may be used to resume the download operation at the correct point after power is restored. The recovery algorithm is analogous to the recovery algorithm described above for application of a downloaded software patch to main image file 320.

Although the present invention has been described with an exemplary embodiment, various changes and modifications may be suggested to one skilled in the art. It is intended that the present invention encompass such changes and modifications as fall within the scope of the appended claims.

What is claimed is:

1. A wireless communication device capable of downloading a software update file from a wireless network, said wireless communication device comprising:
   a non-volatile memory capable of being re-programmed by sectors, wherein said non-volatile memory stores: 1) a target file to be updated, 2) said downloaded software update file, and 3) a journal comprising a plurality of entries, each of said plurality of entries created upon a successful completion of each operation that updates a status information associated with a re-programmed sector of said non-volatile memory, wherein the status information comprises a first parameter configured to indicate a start of re-programming the re-programmed sector, second parameter configured to indicate that previous contents of the re-programmed sector were correctly stored in a save area, and a third parameter configured to indicate successful re-programming of the re-programmed sector;
   a random access memory; and
   a main processor capable of replacing target code in said target file with replacement code from said downloaded software update file, wherein said main processor creates a first block of replacement code in said random access memory and re-programs a first target sector of said non-volatile memory by storing said first block of replacement code into said first target sector, and wherein said main processor updates a first status information in a first entry in said journal associated with said first target sector, and wherein said main processor is further capable of storing first target code from said first target sector in the save-area of said non-volatile memory prior to storing said first block of replacement code into said first target sector, wherein the journal further comprises information sufficient for a recovery of an error during the replacing of the target code with replacement code through two independently erasable sectors and the save-area sector of non-volatile memory, wherein the journal is configured to be used also in a recovery of an error during the download of the software update file from the wireless network, and wherein upon the error occurring during the download of the software update file, the journal is used to resume the operation of the download of the software update file from the wireless network at the next sequential sector following the last successfully downloaded and saved sector.

2. The wireless communication device as set forth in claim 1 wherein said main processor is further capable of storing said first target code from said save-area back into said first target sector after a power loss in said mobile station.

3. The wireless communication device as set forth in claim 2 wherein said first block of replacement code in said random access memory is equivalent in size to a sector of said non-volatile memory.

4. The wireless communication device as set forth in claim 3 wherein said main processor, after said wireless communication device is restarted after a power loss, uses status information stored in said journal to identify a last successfully re-programmed sector in said non-volatile memory.

5. The wireless communication device as set forth in claim 4 wherein said main processor resumes replacing target code in said target file with replacement code from said downloaded software update file by re-programming a next sequential sector in said non-volatile memory following said last successfully re-programmed sector.

6. The wireless communication device as set forth in claim 5 wherein said journal is stored in at least a first journal sector and a second journal sector of said non-volatile memory.

7. The wireless communication device as set forth in claim 6 wherein said main processor, in response to a determination that said first journal sector is full of journal entries, erases said second journal sector and stores a next journal entry in said second journal sector.

8. A method of upgrading software in a wireless communication device capable of downloading a software update file from a wireless network, the wireless communication device comprising a non-volatile memory that is re-programmed by sectors and stores: 1) a target file to be updated, 2) the downloaded software update file, and 3) a journal comprising a plurality of entries, each of the plurality of entries created upon a successful completion of each operation that updates a status information associated with a re-programmed sector of the non-volatile memory, wherein the status information comprises a first parameter configured to indicate a start of re-programming the re-programmed sector, second parameter configured to indicate that previous contents of the re-programmed sector were correctly stored in a save area, and a third parameter configured to indicate successful re-programming of the re-programmed sector, the method of upgrading software comprising the steps of:
  creating a first block of replacement code in a random access memory of the wireless communication device using replacement code from the downloaded software update file;
  re-programming a first target sector of the non-volatile memory by storing the first block of replacement code into the first target sector;
  storing first target code from the first target sector in a save-area of the non-volatile memory prior to storing the first block of replacement code into the first target sector; and
  updating first status information in a first entry in the journal associated with the first target sector, wherein the journal further comprises information sufficient for a recovery of an error during the software upgrade through two independently erasable sectors and the save-area sector of non-volatile memory, wherein the journal is configured to be used also in a recovery of an error during the download of the software update file from the wireless network, and wherein upon the error occurring during the download of the software update file, the journal is used to resume the operation of the download of the software update file from the wireless network at the next sequential sector following the last successfully downloaded and saved sector.

9. The method as set forth in claim 8 further comprising the step of storing the first target code from the save-area back into the first target sector after a power loss in the mobile station.

10. The method as set forth in claim 9 wherein the first block of replacement code in the random access memory is equivalent in size to a sector of the non-volatile memory.

11. The method as set forth in claim 10 further comprising the step, after the wireless communication device is restarted after a power loss, if using status information stored in the journal to identify a last successfully re-programmed sector in the non-volatile memory.

12. The method as set forth in claim 11 further comprising the step of resuming replacing target code in the target file with replacement code from the downloaded software update file by re-programming a next sequential sector in the non-volatile memory following the last successfully re-programmed sector.

13. The method as set forth in claim 12 wherein the journal is stored in at least a first journal sector and a second journal sector of the non-volatile memory.

14. The method as set forth in claim 13 further comprising the steps, in response to a determination that the first journal sector is full of journal entries, of erasing the second journal sector and storing a next journal entry in the second journal sector.

15. A wireless communication device capable of receiving an incoming software update file transmitted by a wireless network, said wireless communication device comprising:
  a non-volatile memory capable of being re-programmed by sectors, wherein said non-volatile memory stores: 1) a downloaded software update file, and 2) a journal comprising a plurality of entries, each of said plurality of entries created upon a successful completion of each operation that updates a status information associated with a re-programmed sector of said non-volatile memory, wherein the status information comprises a first parameter configured to indicate a start of re-programming the re-programmed sector, second parameter configured to indicate that previous contents of the re-programmed sector were correctly stored in a save area, and a third parameter configured to indicate successful re-programming of the re-programmed sector;
  a random access memory; and
  a main processor capable of storing replacement code from said incoming software update file in said downloaded software update file, wherein said main processor stores a first block of replacement code from said incoming software update file in said random access memory and re-programs a first target sector of said downloaded software update file in said non-volatile memory by storing said first block of replacement code into said first target sector, and wherein said main processor updates first status information in a first entry in said journal associated with said first target sector, and wherein said main processor is further capable of storing first target code from said first target sector in a save-area of said non-volatile memory prior to storing said first block of replacement code into said first target sector, wherein said journal further comprises information sufficient for a recovery of an error during the replacing of the target code with replacement code through two independently erasable sectors and the save-area sector of non-volatile memory, wherein the journal is configured to be used also in a recovery of an error during the download of the software update file from the wireless network, and wherein upon the error occurring during the download of the software update file, the journal is used to resume the operation of the download of the software update file from the wireless network at the next sequential sector following the last successfully downloaded and saved sector.

16. The wireless communication device as set forth in claim 15 wherein the main processor is further capable of storing the first target code from the save-area back into the first target sector after a power loss in the mobile station.

17. A method of downloading software in a wireless communication device capable of receiving an incoming software update file transmitted by a wireless network, the wireless communication device comprising a non-volatile memory that is re-programmed by sectors and stores: 1) a downloaded software update file, and 2) a journal comprising a plurality of entries, each of the plurality of entries created upon a successful completion of each operation that updates a status information associated with a re-programmed sector of the non-volatile memory, wherein the status information comprises a first parameter configured to indicate a start of re-programming the re-programmed sector, second parameter configured to indicate that previous contents of the re-programmed sector were correctly stored in a save area, and a third parameter configured to indicate successful re-programming of the re-programmed sector, the method of upgrading software comprising the steps of:

storing a first block of replacement code from the incoming software update file in the random access memory;

re-programming a first target sector of the downloaded software update file in the non-volatile memory by storing the first block of replacement code into the first target sector;

storing first target code from the first target sector in a save-area of the non-volatile memory prior to storing the first block of replacement code into the first target sector; and updating first status information in a first entry in the journal associated with the first target sector, wherein the first status information comprises a second parameter indicating that the first target code from the first target sector was successfully stored in the save-area of the non-volatile memory, wherein the journal further comprises information sufficient for the recovery of an error during the software download through two independently erasable sectors and the save-area sector of non-volatile memory, wherein the journal is configured to be used also in a recovery of an error during the replacing of target code with the downloaded software , and wherein upon the error occurring during the download of the software update file, the journal is used to resume the operation of the download of the software update file from the wireless network at the next sequential sector following the last successfully downloaded and saved sector.

18. The method as set forth in claim 17 further comprising the step of storing the first target code from the save-area back into the first target sector after a power loss in the mobile station.

* * * * *